Oct. 23, 1951 M. K. LAPORTE 2,572,814

TELEPHONE SHELL AND SIGNAL LIGHT

Filed Jan. 6, 1950

INVENTOR
MARIE K. LAPORTE

BY Shepherd & Campbell
ATTORNEY

Patented Oct. 23, 1951

2,572,814

UNITED STATES PATENT OFFICE 2,572,814

TELEPHONE SHELL AND SIGNAL LIGHT

Marie K. Laporte, Arlington, Va.

Application January 6, 1950, Serial No. 137,200

8 Claims. (Cl. 179—179)

This invention relates to improvements in telephone lighting apparatus and the present application is a continuation-in-part of my co-pending application Serial No. 134,242, filed December 21, 1949, now abandoned.

The said co-pending application relates, among other things, to ornamental plastic shells fitting over the telephone base and having associated therewith electric lighting means and a control switch therefor actuated by movement of the telephone handset so as to illuminate the dial when the telephone is in use. The purpose of the present invention is to improve such prior arrangement by providing additional light control means responsive to the sound of the telephone signal bell to energize the light upon the ringing of the bell. Thus, in addition to providing for illumination when outgoing calls are made or when the telephone is in actual use, the present invention provides for illumination in the case of incoming calls prior to lifting of the handset.

Such ornamental plastic shells have met with wide favor and it is the general purpose of the present invention to combine with their decorative desirability the utilitarian advantages of affording illumination when needed for dialing, writing or reading of notes and the like or as a visual aid for use of a telephone in darkened rooms or by the deafened.

It is a further object of the invention to provide a self contained unit providing the foregoing advantages which requires no electrical connection with or other modification of any standard telephone receiver and transmitter and which is fully operable upon the mere act of fitting the shell into place on the telephone base or desk set.

Other objects and advantages of the present invention will be apparent from the following detailed description taken in conjunction with the accompanying drawings wherein a preferred embodiment of the principles of the invention has been selected for exemplification, it being understood that the particular designs of the telephone and shell, as shown, are merely illustrative of those currently in use and not in limitation of the invention.

Figures 1, 2, 3, 4, 5:
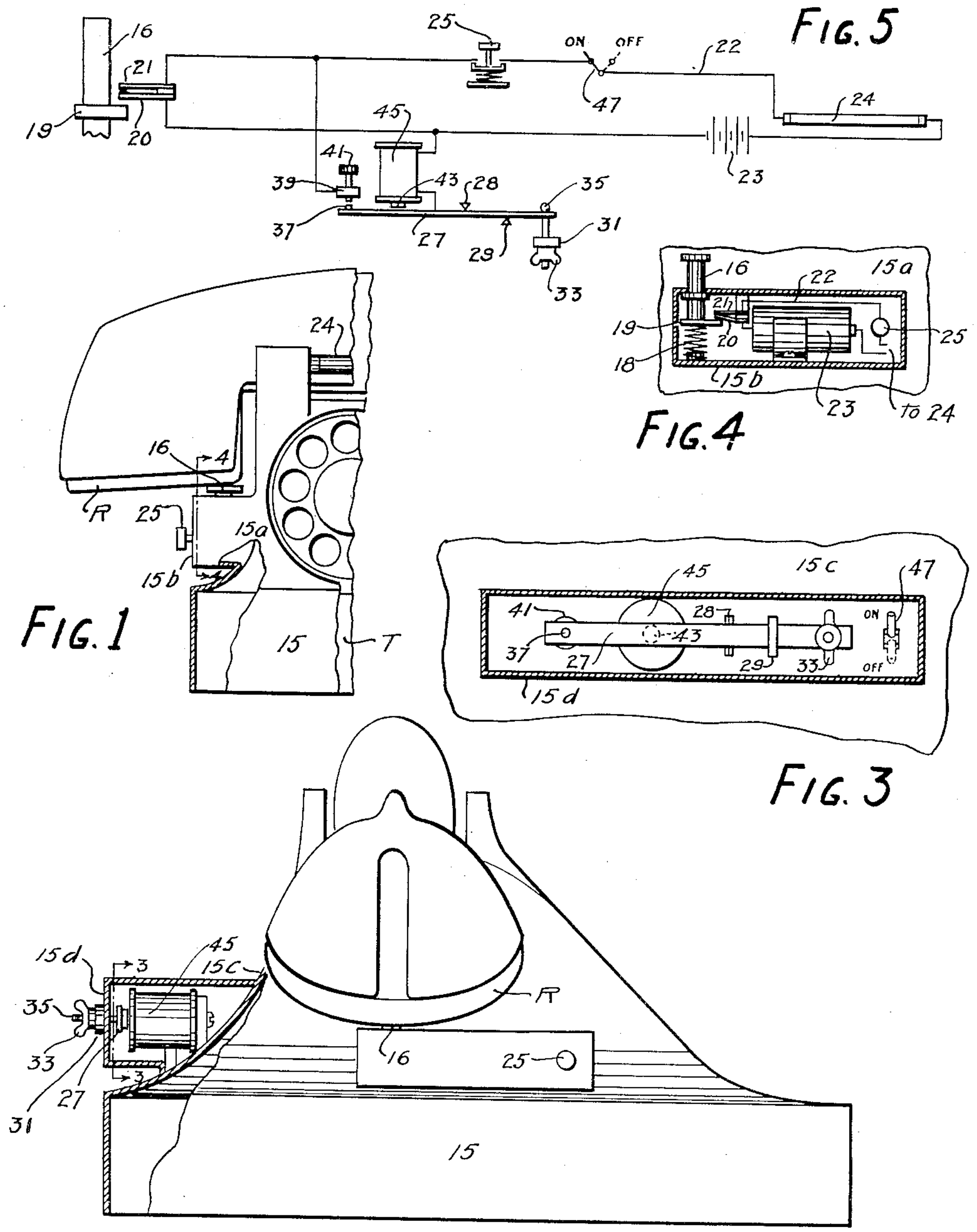
Fig. 1 is a partial front view of an ornamental plastic shell which fits over the telephone base having lighting means associated therewith and showing the mechanism for operating such lighting means upon movement of the receiver.
Fig. 2 is an end view of the device shown in Fig. 1 partially broken away to show the mechanism for operating the lighting means upon ringing of the telephone signal bell.
Fig. 3 is a sectional view on line 3—3 of Fig. 2.
Fig. 4 is a sectional view on line 4—4 of Fig. 1.
Fig. 5 is a diagrammatic view of the lighting circuit of Figs. 1–4.

Referring more particularly to the drawings wherein like numerals refer to like parts, Figs. 1 and 4 illustrate telephone attachment mechanism constructed and arranged to operate lighting means upon the lifting or lowering of a combined telephone transmitter and receiver indicated at R. To this end, 15 designates a hollow plastic shell dimensioned to fit snugly over the base or desk set T of a conventional telephone to form an ornamental cover. The shell may be of any desired color or ornamental appearance and may, if desired, be provided with portions of luminous material. For housing the switching mechanism, shell 15 is provided upon its side wall 15*a* with a switch box 15*b* which may be molded as a part of the plastic shell or be a separate element, as desired.

A plunger 16 projects above the top of the switch box 15*b* and lies in position to be engaged and depressed by the handset R when said receiver is placed upon the base. When the handset R is lifted plunger 16 rises under the action of a spring 18 and a collar 19 carried by the plunger moves a contact strip 20 into engagement with a strip 21 to complete a circuit 22 in which a battery 23 and an electric light 24 are included. In the preferred form of the invention shown, the electric light 24 may be in the form of a small elongated tube conveniently positioned between the upright cradles at the face of the shell above the telephone dial but it is understood that the lamp may take any other suitable form and may be located in any other suitable position for the illuminating effects desired. The power supply for the light circuit may be a battery 23, as shown, or current may be conventionally supplied to the circuit through an ordinary electric cord connected into circuit 22 in lieu of the battery.

Figs. 2 and 3 illustrate mechanism constructed and arranged in accordance with the present invention for energizing the lighting means upon ringing of the telephone bell or other audible signalling means. For housing such switching means, the shell 15 is provided, preferably upon its rear wall 15*c*, with further switch box 15*d*, as shown in Fig. 2. The switch box 15*d* like the box 15*b* may be molded as a part of the plastic shell or be a separate element, as desired.

Disposed within the box 15*d* is a reed or other sound responsive vibrational element 27 adjustable between the guide or stop members 28 and 29 by turning the thumb nut 33 threaded on the screw 35 against the collar 31. The construction and arrangement of the element 27 and adjusting means is such that the same may be regulated to respond to the particular pitch of the telephone audible signaling means which in most cases is capable of being set within a relative wide range. Thus, by means of such flexible adjustment, a plurality of elements 27 within the same room or within the sound range of other telephone bells may be independently regulated to respond only to the signal of the particular telephone with which the switch element is associated.

Upon the response of element 27, the circuit 22 to the lamp 24 is completed through the opposed contacts 37 and 39 at the free end of the element which are relatively adjustable by screw 41 and through the contact point 43 of a solenoid 45 which maintains completion of the circuit and energization of the lamp, it being understood that the element 27 is provided with a conducting portion forming a part of the circuit 22. For deenergizing the lamp 24 when the circuit is completed through the element 27, a push button switch 25 is provided in the circuit 22 and, as shown, may be conveniently carried by the box 15b at the side of the shell. On occasion it may be desirable to render inoperative the lighting means for certain periods and for such purposes an On and Off switch 47 is connected in the circuit 22 and preferably mounted on the box 15d at the rear of the device, as shown in Fig. 3, because of likelihood of infrequent use.

Referring to Fig. 5, it will be seen that the circuits through the plunger 16 and the reed element 27 are connected in parallel so that the light source 24 may be energized by either means and deenergized by depression of the plunger 16 or the button 25 as the case may be or, of course, in either case by the switch 47.

It is understood that the invention is not limited to the precise construction set forth herein but includes within its purview whatever changes fairly come within either the terms or the spirit of the appended claims.

Having described my invention what I claim is:

1. The combination with an ornamental shell shaped to fit over and house a telephone desk set, an electric light and a control switch therefor both mounted upon and bodily carried by said shell, said switch being provided with actuating means in the path of movement of the telephone handset when the latter is placed upon the desk set so as to effect energization of said light when the handset is lifted from the desk set and a second control switch mounted upon said shell connected in parallel with said electric light and including means responsive to the sound of the telephone audible signal whereby to energize said light upon the sound of said signal.

2. The combination with an ornamental shell for a telephone desk set, said shell including a pair of cradle members for the handset, illuminating means in the form of an elongated electric lamp mounted on said shell between said cradle members and switch means in circuit with said lamp mounted on said shell adjacent one of said cradle members and including means operable upon lifting of said receiver whereby to energize said lamp.

3. The article of claim 2 including a second switch means mounted on the shell in circuit with the lamp and including means responsive to the audible telephone signal whereby to energize said lamp.

4. An ornamental shell shaped to fit over and house a telephone desk set, mounting means on said shell for an electric lamp, an electric circuit and source of energy for said lamp, a switch box on a side wall of said shell, a switch in said box having a control plunger projecting upwardly with respect thereto to lie in the path of movement of the telephone handset when the latter is placed upon the desk set, a second switch box on the rear wall of said shell, a second switch in said rear box having a control reed responsive to the audible telephone call signal whereby to energize said lamp upon the sound of said signal and a circuit opening switch to deenergize said lamp on said side wall box.

5. An attachment for a telephone including a sound signal and a circuit therefor, a separable shell to fit over and house the telephone desk set portion, an electric light source carried exteriorly of said shell, an electric circuit including switch means for said light source independent of said sound signal circuit and carried interiorly of and housed by said shell and a sound responsive element included in said light source circuit also carried interiorly of and housed by said shell, the said sound responsive element being physically unconnected with said sound signal circuit but operable by the sound of said signal to effect closure of said light source circuit.

6. The attachment of claim 5 wherein the shell includes a pair of cradle members for the telephone handset and an aperture for the telephone dial and the light source is disposed between said cradle members above said dial aperture.

7. An attachment for a dial type telephone desk set comprising a separable shell shaped to fit snugly over and house the desk set, said shell having an opening through a front wall thereof through which the conventional dial of the telephone is accessible and visible, an electric light carried wholly by the shell adjacent said opening and located in a position to illuminate the numbers of the dial, said telephone comprising a conventional call bell and operating circuit therefor; an electric circuit wholly independent of the telephone and the circuit of its call bell, a switching means in the last named electric circuit, said electric light also being included in said last named circuit, and means for delivering electric current to the last named circuit, said switching means being responsive to and controlled by the impingement thereon of sound waves emanating from said call bell and movable to complete the light including circuit, under the influence of said sound waves.

8. An assembly as recited in claim 7 in combination with an electrically energized magnetic means acting when energized to hold the switching means in light circuit closing position, said magnetic means being also included in the last named circuit.

MARIE K. LAPORTE.

REFERENCES CITED

The following references are of record in the file of this patent:

UNITED STATES PATENTS

| Number | Name | Date |
|---|---|---|
| D. 155,347 | Katz | Sept. 27, 1949 |
| 1,864,910 | Jewell | June 28, 1932 |
| 1,872,372 | Wensley | Aug. 16, 1932 |
| 2,299,279 | Pullis | Oct. 20, 1942 |
| 2,316,540 | Danley | Apr. 13, 1943 |
| 2,464,595 | Masabny | Mar. 15, 1949 |
| 2,473,775 | Allen | June 21, 1949 |
| 2,477,918 | Wortman | Aug. 2, 1949 |